(12) United States Patent
Reininger et al.

(10) Patent No.: US 7,750,647 B2
(45) Date of Patent: *Jul. 6, 2010

(54) POSITION DETECTING DEVICE WITH A MICROWAVE ANTENNA ARRANGEMENT AND A METHOD FOR THE MANUFACTURE THEREOF

(75) Inventors: Thomas Reininger, Wernau (DE); Marcus Maier, Stuttgart (DE)

(73) Assignee: Festo AG & Co. KG, Esslingen (DE)

( * ) Notice: Subject to any disclaimer, the term of this patent is extended or adjusted under 35 U.S.C. 154(b) by 1026 days.

This patent is subject to a terminal disclaimer.

(21) Appl. No.: 11/486,788

(22) Filed: Jul. 14, 2006

(65) Prior Publication Data

US 2007/0035464 A1 Feb. 15, 2007

(30) Foreign Application Priority Data

Aug. 11, 2005 (EP) .................... 05017443

(51) Int. Cl.
*G01R 27/04* (2006.01)
(52) U.S. Cl. ..................... 324/644; 324/637
(58) Field of Classification Search ................ 324/637, 324/644; 73/114.28; 92/5 R
See application file for complete search history.

(56) References Cited

U.S. PATENT DOCUMENTS

| | | | |
|---|---|---|---|
| 3,375,474 A | 3/1968 | Thompson et al. | |
| 6,722,261 B1 * | 4/2004 | Brown et al. | ............. 92/5 R |
| 6,879,290 B1 | 4/2005 | Toutain et al. | |
| 2005/0140557 A1 | 6/2005 | Kuroda et al. | |
| 2005/0191027 A1 | 9/2005 | Trummer | |

FOREIGN PATENT DOCUMENTS

| | | |
|---|---|---|
| DE | 19903183 A1 | 8/2000 |
| DE | 10205904 A1 | 8/2003 |
| FR | 820721 | 7/1936 |

OTHER PUBLICATIONS

Fayyaz et al., "Design and Analysis of a Circular Patch Antenna on a Finite Conical Ground Plane", IEEE Antennas and Propagation Society International Symposium, vol. 1, 21, pp. 680-683 (1996).
Nusseibeh et al., "Transient Response of a Wide-Angle Cone with Dielectric Loading", Radio Science, vol. 32, No. 5, pp. 1047-1052, Sep.-Oct. 1996.

* cited by examiner

*Primary Examiner*—Vincent Q Nguyen
(74) *Attorney, Agent, or Firm*—Hoffman & Baron, LLP (57) ABSTRACT

A position detecting device serves for finding the distance between a specimen arranged in a conductive structure and a microwave antenna arrangement of the position detecting device, produced by an inventive method, on the basis of microwaves. The microwave antenna arrangement exhibits a dielectric antenna body provided at least in part with an electrically conductive coating, which constitutes a first and a second pole face on a coupling probe of the microwave antenna arrangement.

23 Claims, 5 Drawing Sheets

POSITION DETECTING DEVICE WITH A MICROWAVE ANTENNA ARRANGEMENT AND A METHOD FOR THE MANUFACTURE THEREOF

CROSS-REFERENCE TO RELATED APPLICATION

This application claims priority based on European Patent Application No. 05 017 443.2, filed on Aug. 11, 2005, which is incorporated herein by reference.

BACKGROUND OF THE INVENTION

1. Field of the Invention

The invention relates to a position detecting device for finding the distance between a specimen arranged in a conductive structure and a microwave antenna arrangement of the position detecting device on the basis of microwaves and to a method for the manufacture of a position detecting device.

2. Description of the Related Art

Such a position detecting device is for example described in the German patent publication DE 102 05 904 A1. The conductive structure is constituted by a housing of a pneumatic cylinder or of a hydraulic cylinder, in which a piston is arranged for longitudinal motion. The position detecting device serves for finding the distance of the piston with respect to a longitudinal terminal position, in the vicinity of which the microwave antenna arrangement is arranged. The microwave antenna arrangement comprises a coupling probe, which is held by a dielectric holding system. The housing or, respectively, the conductive structure cooperate with the coupling probe as regards the propagation of the microwaves. It is essential for the distance of the coupling probe from the housing be constant, that is to say that the dielectric holding system ensures having this constant distance.

Accordingly the manufacture of the position detecting device or, respectively, of the cylinder with the position detecting device is impeded and made more expensive, since low manufacture tolerances must be adhered to. Furthermore during the operation of the cylinder or, respectively, of the position detecting device the relative distance of the coupling probe from the conductive structure, that is to say from the housing of the cylinder, may vary, for example owing to pressure loads, mechanical vibrations or the impact of the piston against a terminal abutment in the microwave antenna arrangement.

SUMMARY OF THE INVENTION

One object of the invention is hence to provide a position detecting device with an improved microwave antenna arrangement and a method for the production thereof.

In order to achieve these and/or other objects appearing from the present specification, claims and drawings, in the present invention in the case of a position detecting device of the type initially mentioned there is a provision such that the microwave antenna arrangement comprises a dielectric antenna body, which at least partly is provided with an electrically conductive coating and that the electrically conductive coating constitutes a first and a second pole face of a coupling probe of the microwave antenna arrangement. In order to achieve the object there is furthermore a method as defined in the further independent claim.

The position detecting device in accordance with the invention possesses a microwave antenna arrangement, in the case of which the characteristic distances between the pole faces of the coupling probe are essentially constant. It is then possible for two or more pole faces to be formed on the antenna body which all in all forms a coupling probe or several coupling probes. The first and the second pole faces are for example an inner face and an outer face on the antenna body so that the characteristic distance apart of the two pole faces will have a predetermined size even owing to the wall thickness of the antenna body between the inner face and the outer face, such size preferably having a tight tolerance. It is in this manner that between the two pole faces, which constitute parts of the electrically conductive coating, the characteristic distances are fixedly defined and essentially independent of manufacturing and more particularly assembly inaccuracies.

The coating for instance of copper and/or nickel and/or aluminum and/or gold or some other electrically conductive material may for instance be produced by electroplating and/or by a vapor deposition process, as for example a physical and/or chemical deposition method, i. e. physical vapor deposition, (PVD) or chemical vapor deposition (CVD). In the case of the antenna body it may also be a question of a three-dimensional conductive body, as for instance a so-called molded interconnect device (MID).

The invention also contemplates having one or more pole faces constituted by a radiant body, which is held by the antenna body. The radiant body is for example bonded, snap-fitted, welded, cast or injected in place in the antenna body. The radiant body consists for example of metal. The radiant body has the same electrical polarity as one of the pole faces of the coupling probe and is for example connected directly with same. It is particularly preferred for the radiant body to have material injected or cast around it so that the wall thickness of the antenna body is defined simply by the injection or casting mold. By later machining, as for example lathe-turning and/or milling, the wall thickness may be more exactly set. When the antenna body together with the radiant body held by it is completely hardened and possibly finally machined, it is coated externally with an electrically conductive material, which then constitutes the pole face, cooperating with the radiant body, of the coupling probe.

The radiant body may also be manufactured by casting or injecting an electrically conductive material, as for example an electrically conductive plastic, into the cavity of the antenna body.

The antenna body is then preferably bodily, i. e. with the already premounted radiant body, set in the conductive structure. In the case of the conductive structure it is a question for example of a housing, in which the specimen is arranged. The housing or, respectively, the conductive structure is electrically conductive. On the housing a pole face, formed by the coating, of the electrical antenna body is electrically connected, as for example by soldering in place or soldering thereon, welding, connecting with an electrically conductive adhesive material or the like.

The position detecting device may for example constitute a component of a servo device. The servo device, as for example an electrical and/or fluid power drive, and more especially a pneumatic drive, possesses an electrically conductive housing, in which a servo member, for instance the rotor of an electric motor or, respectively, a piston of the pneumatic drive, is able to move, more particularly linearly. The position detecting device measures for instance the distance of the servo member from a terminal abutment.

The movable specimen or object under test, as for instance the valve member or, respectively, the servo member, reflects microwaves which are fed into the conductive structure or, respectively, the housing with the aid of the coupling probe.

On the basis of a transit time measurement and/or on the basis of a phase comparison between the emitted and received microwaves, which for example are in a frequency range of 10 MHz and 25 GHz, the position detecting device finds the respective distance of the specimen from the coupling probe. It will be clear that the microwave antenna arrangement may also comprise two coupling probes, the one for emitting and the other for receiving microwaves. It is particularly preferred however for only one single coupling probe to be necessary.

The position detecting device in accordance with the invention may however also constitute a component of a fluid power servicing device, e. g. a pneumatic servicing device. The position detecting device then serves for instance for measurement of the quantity of an additive for the fluid, as for example of an oil, which is injected into the fluid, or for measurement of a deposited substance extracted by the servicing device and deposited by it in a receiving space. The position detecting device measures the degree of filling as regards the additive or, respectively, the deposited substance of the receiving space.

In accordance with a further form of the invention it is possible for the position detecting device to constitute a component of fluid valve, for example of a pneumatic valve. The specimen is in this case for instance the valve member of the fluid valve, for example a drive piston, with which the valve member is pneumatically driven.

Preferably a plastic material is employed for the electrical antenna body, such material having a low coefficient of thermal expansion. For instance polycarbonate materials such as Lexan, Makrolon or the like or liquid crystal polymers or copolymers (LCP), e. g. Vectra have been found to be appropriate, Vectra possessing good strength properties and a low coefficient of thermal expansion.

The first and the second pole face will advantageously be at essentially constant distances apart, for example in sections approximately with a constant radial distances. The two pole faces are insulated electrically from each other. It is a advantage for the first and the second pole faces to be concentric to one another. The coupling probe preferably constitutes a coaxial dipole.

The antenna body is preferably a body of revolution, as for example a cylinder or a cone. It may also be essentially a cylinder, more particularly a stepped cylinder, which may possess conical sections.

The antenna body can also comprise a tubular and internally externally coated section, which constitutes a coaxial conductor.

It is possible to provide the first and/or the second pole face at least partly with an electrically insulating layer for example on the inside, facing into the surroundings. As regards the outer side it is more particularly preferred for the pole face located there, more particularly the second pole face, to be in such electrical contact with the conductive structure, in which the specimen is located, that the microwave antenna arrangement may feed microwaves into the conductive structure and/ or accept them from the conductive structure. The interior space of the antenna body may be empty or filled with a material, as for instance a dielectric material or a metal.

In or on the antenna body an electrical conductor may be placed, which connects the first or the second pole face electrically with a microwave emitting means and/or a microwave receiving means. The conductor is preferably coaxially arranged in the antenna body. It will be clear that furthermore several electrical conductors may be present. The electrical conductor or conductors preferably possess a flexible section, which renders possible a mechanical decoupling of the antenna body or, respectively, of the coupling probe from the microwave emitting and/or receiving means. The electrical conductor or conductors preferably bear an external shield. In the case of the electrical conductors it can be a question of a sort of spike, which extends through the antenna body. All in all as sort of pin may be formed.

Further advantageous developments and convenient forms of the invention will be understood from the following detailed descriptive disclosure of embodiments thereof in conjunction with the accompanying drawings.

DETAILED DESCRIPTION OF THE PREFERRED EMBODIMENTS

Figure 1:
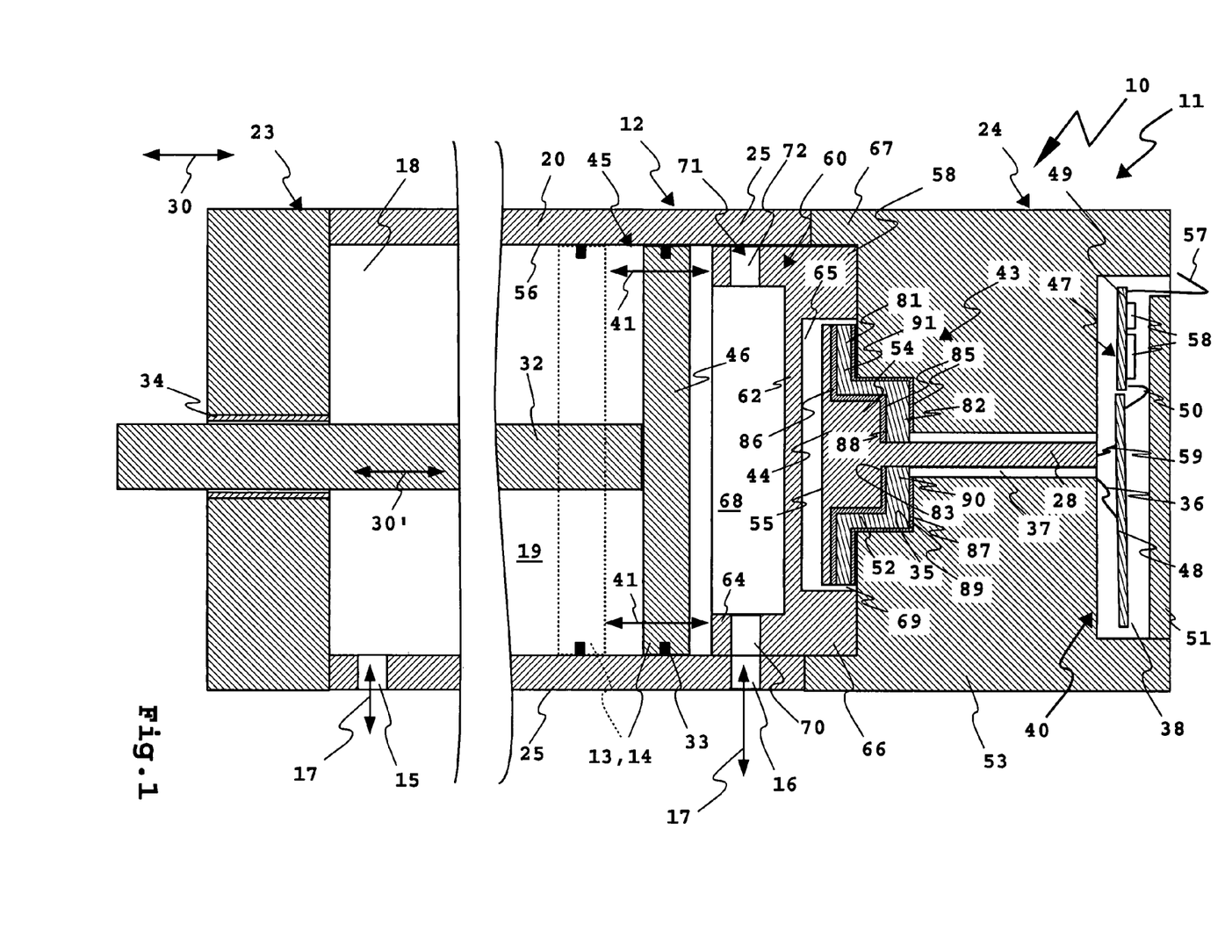
FIG. 1 is a diagrammatic cross sectional view of a servo device which is fitted with a position detecting device in accordance with the invention, generally on the line A-A through a cover of the servo device as shown in FIG. 2.

A pneumatic fluid power cylinder 10 constitutes a servo device and more particularly a fluid power servo device. In a housing 12 a piston 13, forming a servo member 14, is able to reciprocate linearly. By way of fluid and or, respectively, compressed air connections 15 and 15 compressed air 17 may flow into and out of a chamber 18, constituting a motion space 19 for the servo member 14 to drive the piston 13.

A middle part 20 of the housing 12 possessing a peripheral wall 25, for example of metal, is tubular in design and has an internal cross section, which correlates with an external outline of the servo member 14 and for example is essentially circular. An end plate 23 with a bearing and a terminal end plate 24 or cover, more particularly of metal, at the ends of the housing 12 shut off the chamber 18 in an air tight manner, for example with plain seals, o-ring seals or the like between end plate 23 and terminal end plate 24 and the middle part 20. The end plates 23 and 24 are secured in position by bolts, which extend through holes 21 to reinforcing and holding ribs 29.

Around the piston 13 there annularly extends a seal 33 so that the piston 13 divides the chamber 18 into two space parts in a pressure-tight fashion from each other. The piston rod 32 constitutes a force transmitting member, which extends through the end plate 23 or cover with the bearing and is borne there by a bearing 34.

The piston 13 is able to move in the longitudinal direction 30 between the end plate 23 with the bearing and the terminal end plate 24 (arrow 30'). A position detecting device 40 determines the distance 41 of the servo member 14 in relation to its end position 42 at the terminal end plate 24. The position detecting device 40 operates using microwaves, for example in a range of 10 MHz to 25 GHz and preferably approximately 3 through 10 GHz, which are emitted by a microwave antenna arrangement 43 with a coupling probe 44 into the motion space 19, which at least at its internal side is essentially electrically conductive and accordingly constitutes a conductive structure 45 for the microwaves.

The member 14 constitutes a specimen 46 which reflects the microwaves. In a manner dependent on the respective position of the specimen 46 in the motion space 19—a position of the servo member 14 remote from the terminal position 42 is indicated in chained lines—the phase relationship of the microwaves emitted and received by the microwave antenna arrangement 43 varies. On the basis of the phase relationship and/or the transit time of the microwaves it is possible for an evaluating means 47 of the position detecting device 40 to find the position of the servo member 14 in the motion space 19 and for example communicate same to a control means, not illustrated, for the control of the servo device 11, for instance to a memory programmed control device. The evaluating means 47 comprises, for example, an emitting means and a receiving means for the emission and reception of the microwaves with the aid of the coupling probe 44 and other components 58, as for example a digital signal processor, a bus coupler, an emitting and/or receiving means for wired and/or wireless emission and a receiving means for emission or transmission of position signals by means of an antenna 57 and/or a conductor, not illustrated, to the master control and the like.

The evaluating means 47 comprises for example a high frequency board 48 with components not named here in detail and printed wiring for the production or, respectively, emission and reception of microwaves and an evaluating board 49, which for example comprises a bus feed means. The high frequency board 48 comprises or constitutes a microwave emission means and a microwave reception means. The boards 48 and 49 are electrically connected together, for example using a plug cable 50. A cover 51 protects the boards 48 and 49 which are for example arranged in a chamber 38 of the housing 12 or respectively in the terminal end plate 24, against environmental effects.

The microwave antenna arrangement 43 includes an electrically insulating or, respectively, dielectric antenna body 52 which for example has a stepped, cylindrical configuration. The antenna body 52 is preferably a synthetic resin injection molded component, more particularly of an electrically insulating plastic with a low coefficient of thermal expansion.

The antenna body 52 holds, centrally and more particularly in a coaxial manner, an at least externally electrically conductive radiant body 54 of the microwave antenna arrangement 43.

The antenna body 52 and therefore the microwave antenna arrangement 43 are centrally and more especially coaxially arranged with the measurement and motion space 19 on a rear end wall 53 of the terminal end plate 24, and for example plugged into, bonded in, screwed in or connected permanently with in some other way a corresponding recess or socket 35 in the end wall 53. The socket 35 possesses an inner outline, (and more particularly an antenna section 27) which correlates with the outline of the antenna body 52 so that same engages the inner faces of the socket 35 over a substantial area.

The radiant body 54 has first pole faces 55 cooperating with second pole faces 56 on the housing 12 and, respectively, the conductive structure 45. The radiant body 54 extends through the antenna body 52 and is electrically connected by way of a conductor 59 with the high frequency board 48. The electrically conductive end wall 53 and accordingly the housing 12 are connected by way of a conductor 36, for example a bonded one, with the high frequency board 48.

In a generally umbrella-like configuration a front end wall 26 of the radiant body 54, arranged on the central cylindrical antenna section 27 extends toward the measurement and motion space 19 and by means of an electrical conductor section 28 is connected with the high frequency board 48. The conductor section 28 passes through the antenna body 52 and a channel 37 in the end wall 53, preferably with an insulating distance from the end wall 53, to the high frequency board 48 and is connected, by way of the preferably flexible conductor 59, in a mechanically decoupled fashion, with the high frequency board 48. The conductor section 28 could also be plugged into the board 48, if at its end a male means were present to cooperate with a female socket in the board 48.

Figure 2:
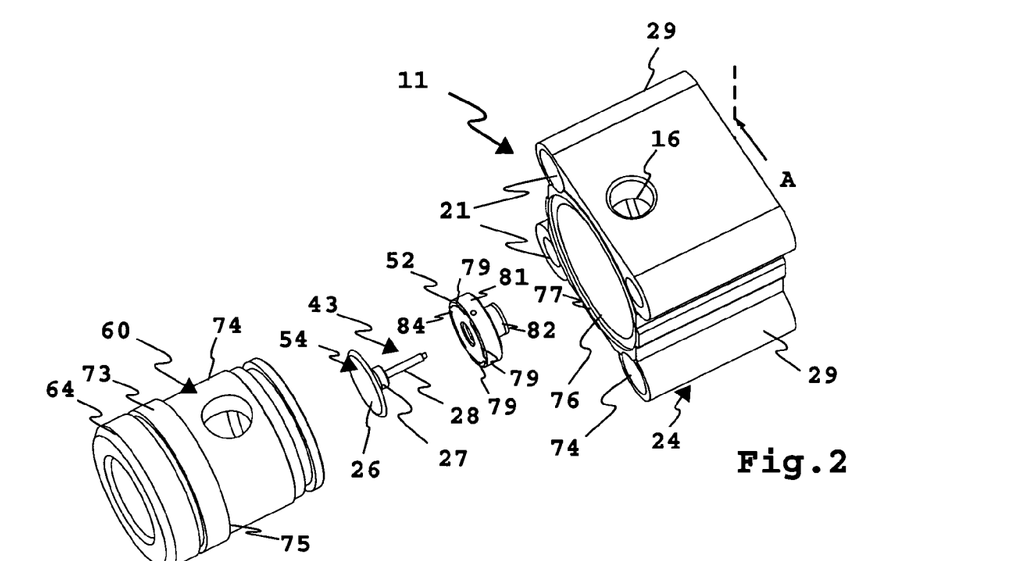
FIG. 2 is a perspective exploded view of the cover portion of the servo device in accordance with FIG. 1 with a guard covering means, a radiant body and an antenna body for holding the radiant body.

The end wall 26 engages an end side 84 of a front part 81 of the antenna body 52, more especially on projections 79 resembling circular segments. The front part 81 has a larger periphery than a rear section 82 of the antenna body 52, which is received in the socket 35. The front part 81 engages the end wall 53 to the fore or, respectively, stands proud of the end wall 53.

The microwaves are radiated away from the end wall 26 toward the motion space 19 out of a coaxial mode into a wave guide mode.

The radiant body 54 is for example an essentially metallic insert, which is bonded and/or welded on the antenna body 52 and is more especially bonded or welded in a receiving space 83 in the antenna body 52. In accordance with a further design of the invention the radiant body 54 is an inlay or incast part set in a molding process and more particularly injection molding process in the antenna body 52.

The position of the microwave antenna arrangement 43 in relation to the housing 12 or, respectively, the conductive structure 45, with which the microwave antenna arrangement 43 cooperates, and more especially however the position of the pole faces of the microwave antenna arrangement 43 in relation to each other, are essential for exactly setting the distance 41. In order for such positioning of the microwave antenna arrangement 43 to be adhered to and accordingly for a high accuracy of measurement to be achieved, the following measures are taken in the case of the servo device 11.

A guard cover means 60 provides a pressure-tight seal sealing off the microwave antenna arrangement 43 from the pressure and motion space 19. In front of the microwave antenna arrangement 43 a cover section 62 is arranged, which is held by an abutment section 61 and more particularly an abutment ring 64. The two parts 62 and 64 are connected together in a pressure-tight manner, e. g. by means of seals, not illustrated, or they are of integral design. The abutment ring 64 constitutes at the front an abutment 63 for the piston 13. The guard cover means 60 is inserted in the housing 12 in a pressure-tight manner, for example molded on the end plate 24 and/or engaged by seals (not illustrated), e.g. between an outer periphery of the guard cover means 60 and the sides or peripheral wall 25 and/or a side or peripheral wall of the end plate 24. In the rear section of the guard cover means 60 a chamber 65 is defined by the floor-like cover section 62 and a rear side wall 66. A front part, projecting to the fore of the end wall 53, of the microwave antenna arrangement 43 is accommodated to protect it against environmental effects in the chamber 65 and has a clearance 69 to the fore and preferably to the side, from the guard cover means 60, into which clearance the cover section can deform, e. g. owing to a pressure wave, which is engendered by the servo member 14.

The abutment ring 64 projects to the fore of the terminal end plate 24 and extends into the middle part 20. At its front section, between the abutment 63 and the intermediate cover, which constitutes the terminal section 62, the abutment ring 64 delimits a receiving space 68, for example for a terminal position damping means, not illustrated, on the front of the piston 13.

The guard cover means 60 has fluid duct 70 for connecting the chamber 18 with the compressed air connection 16, which for example extends right through the abutment ring 64.

To enable the microwaves to radiate substantially symmetrically in the motion space 15 the fluid duct 70 is provided with a blind alley duct 72 as a compensating means 71, such duct 72 extending on the side, opposite to the fluid duct 70, of the abutment ring 64. The blind alley duct 72 terminates at the peripheral wall 67, i. e. the peripheral wall 67 seals off the blind alley duct 27 radially from the outside.

The guard cover means 60 consists of a dielectric material, more particularly a plastic with a low coefficient of thermal volumetric change, for example of Lexan, Vectra or the like. The guard cover means 60 is matched to the radiating characteristics of the microwave antenna arrangement 43 so that the microwaves, which are radiated by the microwave antenna arrangement 43, are propagated in a predetermined mode in the conductive structure 45 or, respectively, in the motion space 19.

A front part 73 of the guard cover means 60 exhibits a larger diameter than a rear part 74 so that between the front and the rear part 73 and 74 an abutment 75 is formed. This is not illustrated in the diagrammatic showing of FIG. 1. The abutment 75 engages an end face 77 of the peripheral wall 67 of the terminal end plate 24 or cover. Accordingly the guard cover means 60 bears against the rear end wall 53 of the terminal end plate 24 and the end face 77.

The antenna body 52 is provided with an electrically conductive coating 85, which e. g. comprises copper and/or nickel and/or aluminum and/or gold. The coating 85 is applied by electroplating, chemical and/or physical vapor deposition, sputtering or the like on the antenna body 52. The coating 85 forms a first and a second pole face 86 and 87 connected with the first and second pole faces 55 and 56 electrically, e. g. by adhesive bonds and/or electrical contact and/or soldered joints or the like.

The first pole face 86 is formed on the end side 84 and an inner face 88 of the receiving space 83. The radiant body 54 is for example press fitted in the receiving space 83 so that the first pole faces 86 and 55 are electrically in contact with each other. It is also possible to provide an electrically conductive adhesive between the pole faces 55 and 86

The second pole face 87 is formed on the outer periphery of the antenna body 52 connected electrically with the conductive structure 45, and e. g. press fitted and/or bonded in an electrically conductive manner and/or soldered in place or the like in the socket 35.

The thickness of a wall 90 of the antenna body 52, on whose inner face 88 and outer periphery 89 the metallized layer or other layer 85 is arranged, is constant in sections thereof. Accordingly even the respective distances in sections between the first and the second pole faces 86 and 87 are at least essentially constant so that microwaves emitted by the microwave antenna arrangement 43 have optimum frequency characteristics.

The antenna body 52 is manufactured of a dielectric material, and more particularly a plastic with a low coefficient of thermal volumetric change, as for example Lexan, Vectra or the like. For example as part of the molding methods it is possible for the thickness of the wall 90 to be optimally set. It would be feasible as well to produce the antenna body 52 as lathe-turned part in order to optimize the manufacturing quality or, respectively, the thickness of the wall 90.

Figure 3:
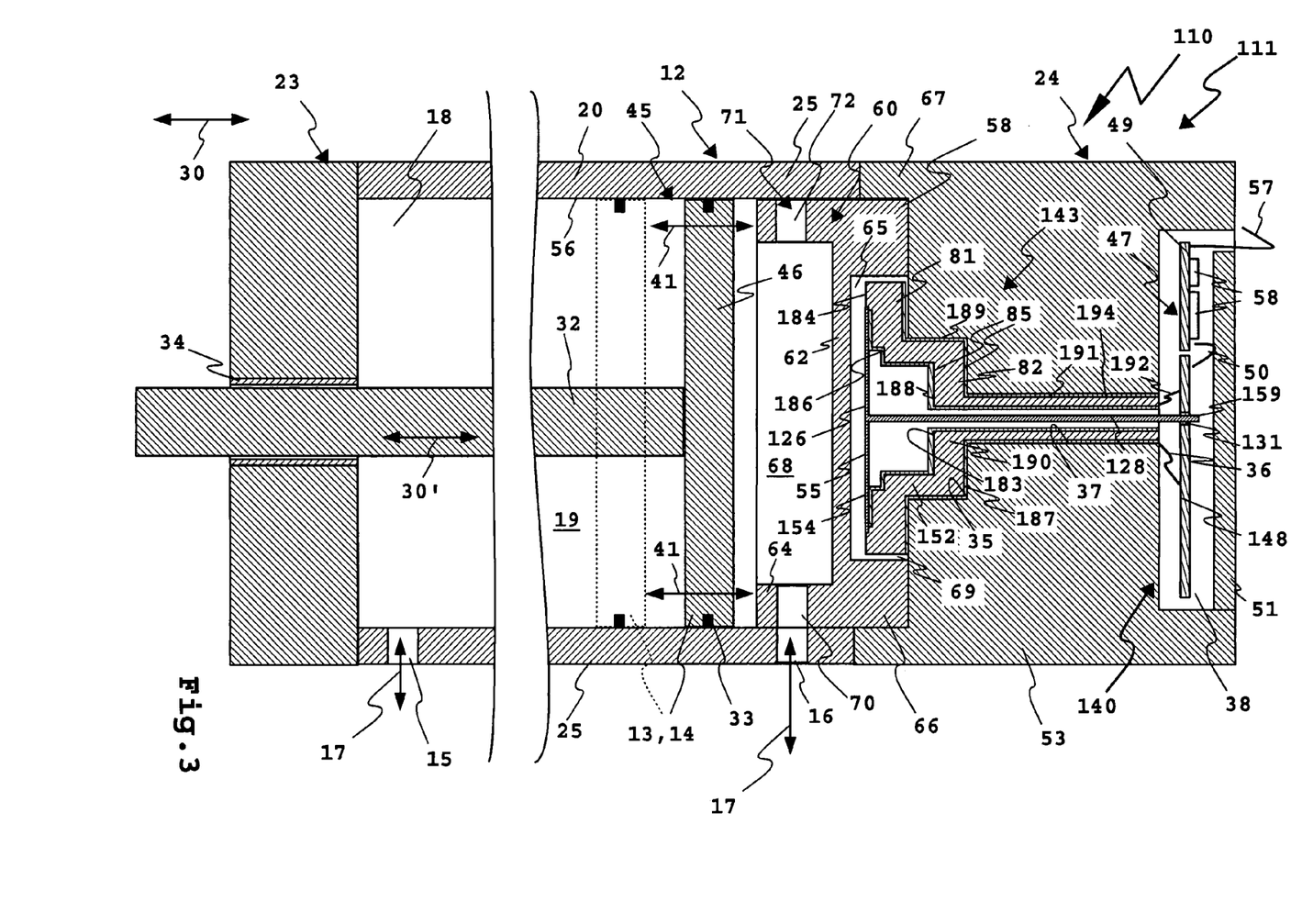
FIG. 3 is a diagrammatic cross sectional view of a second servo device with a further working example of a microwave antenna arrangement in accordance with the invention.

The antenna body 52 may also be screwed in the socket 35. Furthermore it is possible to clamp an antenna body coated in accordance with the invention on the respective conductive structure, for example with an inserted radiant body as a sort of radiant body 54, which extends through the antenna body and is screwed to the conductive structure, for example the housing 12, the board 48 or the like. Such a modification of the design is for example employed in the case of a servo device 111, i. e. a pneumatic linear drive 110.

The servo device 111 is partially the same as the servo device 11 so that identical or similar components bear the same reference numerals. Modified components bear reference numerals increased by 100 as compared with those used in FIG. 1.

The servo device 111 comprises a microwave antenna arrangement 143 of a position detecting device 140 with an antenna body 152 of a dielectric material, e. g. a plastic. A wall 190 of the antenna body 152 delimits a socket or, respectively, a receiving space 183, which at its front side facing the measurement or, respectively, motion space 19 is shut off by an end wall 126 of a radiant body 154.

A spike-like conductor section 128 extends to the rear from an end wall 126 of the radiant body 154, such section 182 connecting the end wall 126 electrically with a high frequency board 148. At the rear end the conductor section 128 has for example a screw section or a plug section 159, which is screwed or plugged into a plug socket 131. The plug section 159 can be a soldering section, which soldered to the high frequency board 148.

A tubular channel section, in the following termed a tube section 191, extends from the receiving space 183 to the rear, such tube section 191 being plugged into the channel in the terminal end plate 24. The conductor section 128 of the radiant body 154 extends through the tube section 191 to the rear with or without an insulating clearance (not illustrated) from the tube section 191.

The receiving space 183 and in part an end side 184 of the antenna body 152 are preferably coated with a metallic material and so made electrically conductive. Accordingly a first and a second pole face 186 and 187 are formed on the inner side 188 and the outer side 189 of the wall 190. The pole faces 186 and 187 extend furthermore over the tube section 191 so that the inner side and the outer side of the tube section 191 are metallized to render them electrically conductive. Accordingly the tube section 191 is a coaxial conductor 194.

The end wall 126 of the radiant body 154 engages an inner portion of the end side 184 of the antenna body 152 and is electrically connected with the first pole face 186, which extends here, for example with the aid of electrically conductive adhesive or the like. In the receiving space 183 a cavity is formed, which is delimited in a radially outward direction by the wall 190 and at the end by the end wall 126.

Figure 4:
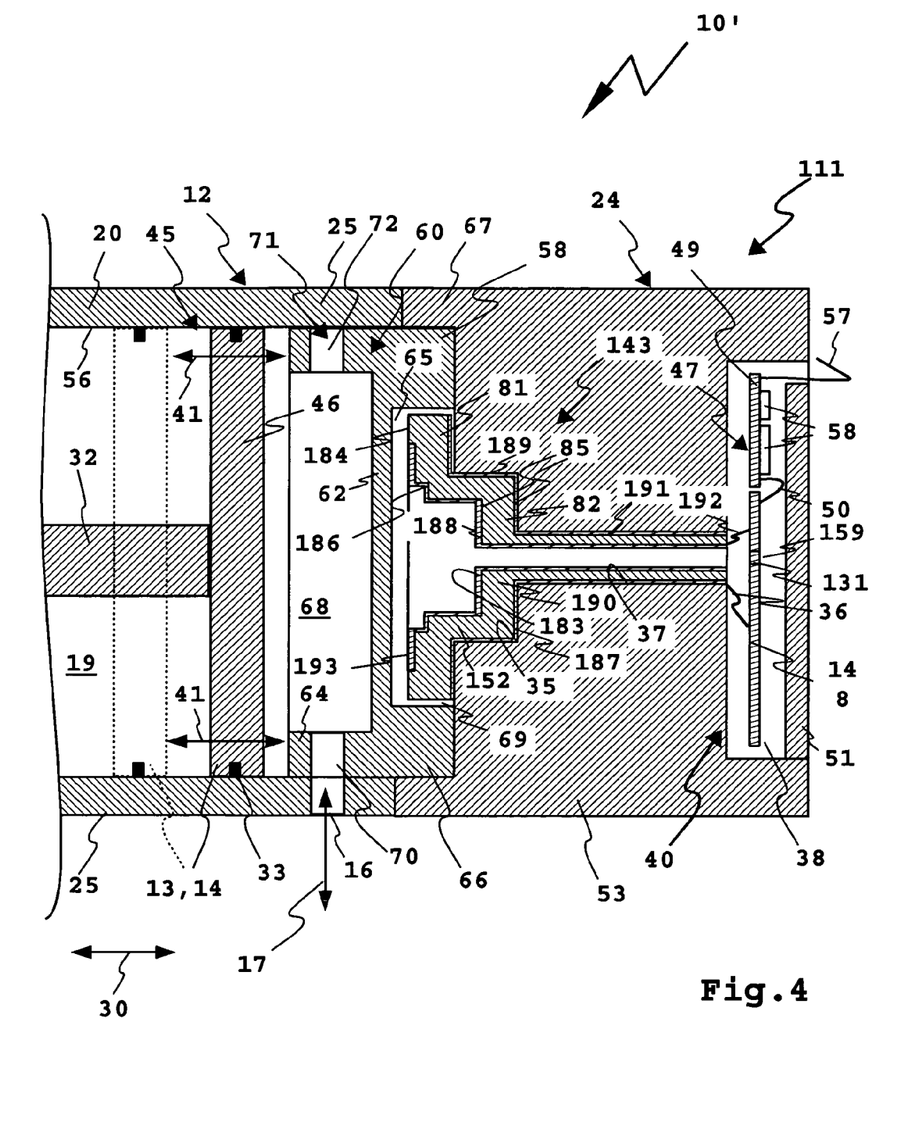
FIG. 4 is a diagrammatic cross sectional view of a further working embodiment of a microwave antenna arrangement in accordance with the invention in a partial cross sectional view generally similar to FIG. 3.

The first inner pole face 186 of the antenna body 152 can also be connected electrically with the high frequency board 148 or, respectively, with the evaluating means 47. The radiant body 154 could even be omitted so that the antenna body 152 would constitute an antenna in itself. Such a modified design is depicted in FIG. 4. In a further development of the modified design depicted here of the antenna body 152 the end side sections 193 of the first pole face 186 could be larger in size. This design illustrated in FIG. 4 of the invention has particularly low manufacturing inaccuracies, since even owing to the antenna body 152 a complete antenna dipole or, respectively, a coupling probe is formed and the coating 85 at any rate is at the desired defined distance in all sections of the antenna body 152.

Furthermore in the case of a modification of the working example in accordance with FIG. 1 it would be feasible as well for the coating 85 only to be externally applied so that antenna body 52 only an external second pole face 87 would be arranged.

It is possible too for the antenna body to have material of the radiant body 54 injection molded around it and then for the outer side of the antenna body 52 with the second pole face 87 to be coated to make it electrically conductive.

The method in accordance with the invention of manufacturing a microwave antenna arrangement by coating a dielectric antenna body permits numerous degrees of freedom as regards the geometry of the respective coupling probe. For instance an essentially conical or horizontal configuration could be readily adopted as is the case with a microwave antenna arrangement 200 as shown in FIG. 5.

A outwardly conical wall 202 of an antenna body 210 with an essentially flat end side 203 delimits a rearwardly open inner space 204. The external periphery 201 and the inner space 204 are provided with a coating 205 with the result that electrically insulated first and second pole faces 206 and 207 are formed. The pole faces 206 and 207 are for example able to be connected by with conductors 208 with the high frequency board 48 and constitute a coupling probe 209. The thickness of the wall 202 is able to be set during the manufacture of the antenna body 210 so that the distances apart of the two pole faces 206 and 207 and therefore the emitting and receiving characteristics of the microwave antenna arrangement 200 may be exactly set.

Figures 5, 6:
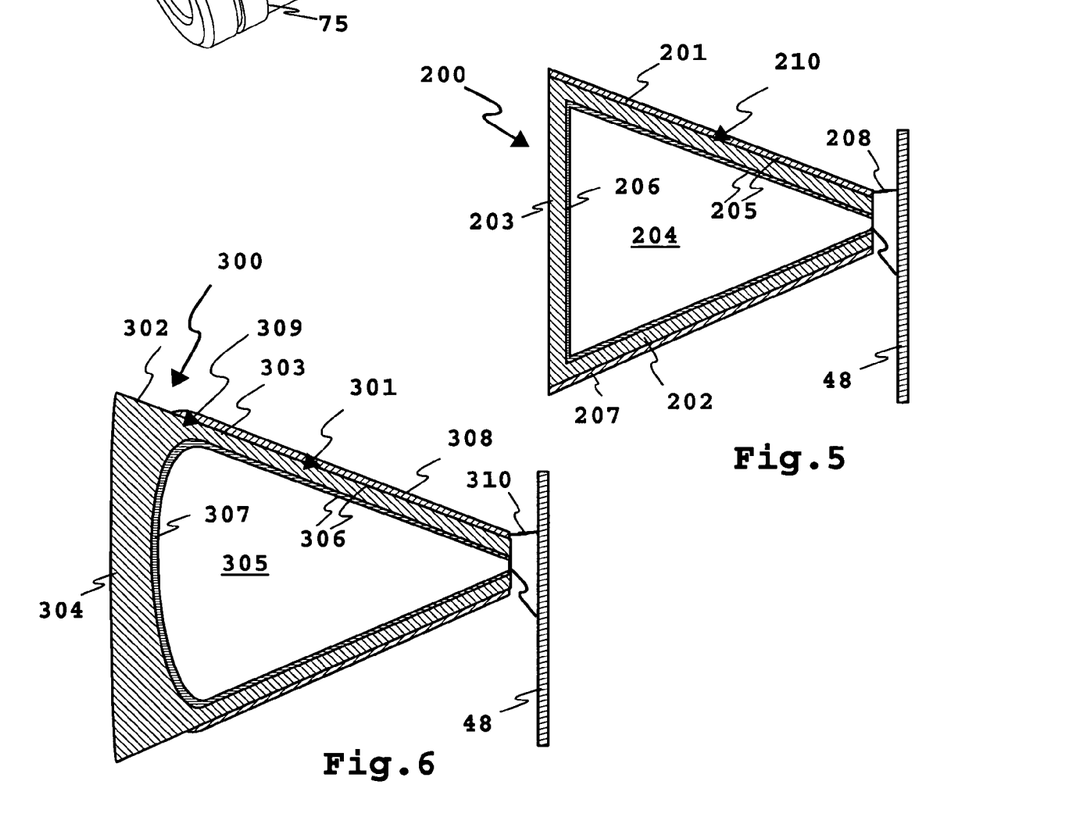
FIG. 5 is a diagrammatic cross sectional view of a coated antenna body, same constituting a microwave antenna arrangement in keeping with the invention.
FIG. 6 is a cross sectional view generally similar to FIG. 5 of a further working example of a coated antenna body in accordance with the invention as part of a microwave antenna arrangement.

A microwave antenna arrangement 300 as shown in FIG. 6 comprises an antenna body 301, which is also essentially conical, of a dielectric plastic material, which is for example manufactured by injection molding. An outer periphery 302 of a peripheral wall 303 of the antenna body 301 is essentially conical. An end wall 304 of the antenna body 301 is externally, i. e. toward a motion space of a servo member or, more generally, a measurement space, essentially planar, but however on the inner side is rounded off at the its inner space 305. The inner space 305 has a club-like configuration. The inner space 305 is delimited by the peripheral wall 303 and the end wall 304.

The inner space 305 is coated to be electrically conductive so that a first pole face 307 is formed. At the outer periphery 302 a second pole face 308 is constituted by an electrically conductive coating 306. The first pole face 307 is not continued quite as far as the front side of the end wall 304. The pole faces 307 and 308 together constitute a coupling probe 309, which by means of preferably flexible conductors may be connected with a high frequency board 48.

The thickness and also the geometry of walls of an antenna body in accordance with the invention and accordingly substrate faces for the electrical coating, which constitute the first and/or second pole face, the geometrical extent of the area and the thickness of the coating are readily able to be varied in order to produce the desired emitting and receiving characteristics of the respective microwave antenna arrangement.

Figure 7:
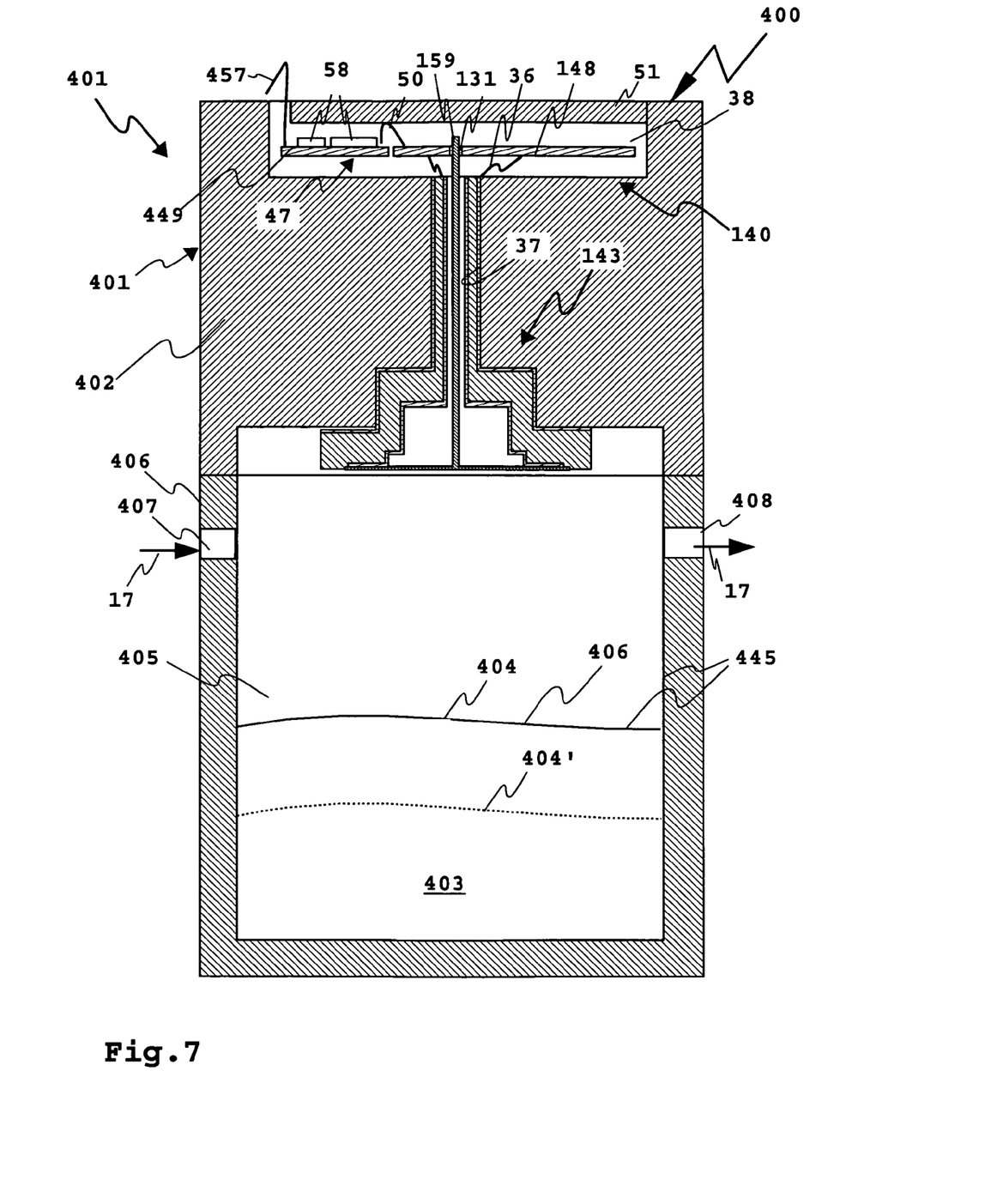
FIG. 7 is a cross sectional showing of a pneumatic servicing device, in the case of which the inventive position detecting device or distance measuring device measures the filling level of a liquid or a powder.

A further field of application of a position detecting device in accordance with the invention is depicted in FIG. 7. The position detecting device 140 described in connection with FIG. 3 is installed in a fluid power and more especially pneumatic servicing device 400, as for example an oiler or a dryer for preparing compressed air 17. The position detecting device 140 is arranged on the top side of a housing 401, in a cover 402 of a container 406 and measures the level 404 and 404' of filling with the liquid 403, as for example a substance deposited from the compressed air 17 or of an additive, which is mixed with the compressed air 17. The liquid 403 is contained in a receiving space 405 of the container 406 underneath the position detecting device 40. The compressed air 17 flows through an inlet 407 into the receiving space 405 and out through an outlet 408 again.

The housing 401 is electrically conductive at least in the receiving space 405 and contains an electrically conductive structure 445. The liquid 403 constitutes a specimen 446. The position detecting device 140 measures the distance 441 of the liquid 403 from a cover 402. The position detecting device 140 sends a signal for the filling level 404 and 404' in a wired manner by way of a conductor 457, more particularly a bus conductor, to a control not illustrated and/or a display means.

What is claimed is:

1. A position detecting device for finding the distance between a specimen arranged in a conductive structure and a microwave antenna arrangement of the position detecting device on the basis of microwaves, wherein the microwave antenna arrangement comprises a dielectric antenna body, which is at least partly provided with an electrically conductive coating and the electrically conductive coating constitutes a first and a second pole face of a coupling probe of the microwave antenna arrangement, the dielectric antenna body providing a continuous wall of the same material between all portions of the first and second pole faces.

2. The position detecting device as set forth in claim 1, wherein the first or the second pole face is electrically connected with the conductive structure.

3. The position detecting device as set forth in claim 1, wherein between the first and the second pole faces essentially constant and more particularly radially constant distances are maintained.

4. The position detecting device as set forth in claim 1, wherein the first and the second pole face are electrically insulated from one another.

5. The position detecting device as set forth in claim 1, wherein the first and the second pole faces are concentric to each other.

6. The position detecting device as set forth in claim 1, wherein the first pole face is arranged on an inner face of the antenna body and/or an end side of the antenna body or forms same and the second pole face is arranged on the outer face of the antenna body or forms same.

7. The position detecting device as set forth in claim 6, wherein the inner space is empty or is filled with an electrically conductive material.

8. The position detecting device as set forth in claim 1, wherein the first pole face and/or the second pole face are at least partially provided with an electrically insulating layer separating them from the surroundings.

9. The position detecting device as set forth in claim 1, wherein the electrically conductive coating is produced by a physical and/or chemical vapor deposition method and/or electroplating and/or laser coating and/or by thermal application.

10. The position detecting device as set forth in claim 1, wherein the antenna body is three-dimensional conductive body.

11. The position detecting device as set forth in claim 1, wherein a section of the antenna body is designed in the form of a coaxial conductor.

12. The position detecting device as set forth in claim 1, wherein the first and/or second pole face is decoupled mechanically using flexible electrical conductor and is connected with the microwave emitting means and/or the microwave receiving means.

13. The position detecting device as set forth in claim 1, wherein pole face is at least partially arranged on an end side, orientated toward the emitting and/or receiving means of the coupling probe, of the antenna body and the second pole face is arranged on an outer periphery of the antenna body.

14. The position detecting device as set forth in claim 1, wherein the first pole face of the coupling probe is formed at least partially by a radiant body held by the antenna body.

15. The position detecting device as set forth in claim 14, wherein the radiant body is connected with a pole face of the antenna body electrically.

16. The position detecting device as set forth in claim 14, wherein the radiant body consists essentially of metal.

17. The position detecting device as set forth in claim 1, constituting a component of a servo device, more particularly of an electrical and/or fluid power drive and the specimen is a servo member of the servo device.

18. The position detecting device as set forth in claim 1 in the form of a part of a fluid power and more particularly pneumatic servicing device designed for measuring the quantity of an additive for the fluid and/or a product deposited from the fluid in a receiving of the servicing device.

19. The position detecting device as set forth in claim 1 in the form of a component of a fluid valve, more especially a pneumatic valve, said specimen being a valve member of the fluid valve.

20. A method for the manufacture of a position detecting device for detecting the distance between a specimen disposed in a conductive structure and a microwave antenna arrangement of the position detecting device on the basis of microwaves, said method comprising providing at least a part of a dielectric antenna body, which constitutes a component of the microwave antenna arrangement, with an electrically conductive coating forming a first and a second pole face on a coupling probe of the microwave antenna arrangement, the dielectric antenna body providing a continuous wall of the same material between all portions of the first and second pole faces.

21. The method as set forth in claim 20, comprising injection molding dielectric material or casting material around a radiant body, constituting the second pole face of the coupling probe to form the antenna body and then at least partially externally coating the antenna body to form the second pole face.

22. A position detecting device for finding the distance between a specimen arranged in a conductive structure and a microwave antenna arrangement of the position detecting device on the basis of microwaves, wherein the microwave antenna arrangement comprises a dielectric antenna body, which is at least partly provided with an electrically conductive coating and the electrically conductive coating constitutes a first and a second pole face of a coupling probe of the microwave antenna arrangement, the microwave antenna arrangement comprising a guard cover that provides a pressure-tight seal sealing off the microwave antenna arrangement.

23. The position detecting device as set forth in claim 22, further comprising a fluid power cylinder including a housing that includes a motion space associated with the specimen.

* * * * *